United States Patent [19]

VanLokeren

[11] 4,331,964

[45] May 25, 1982

[54] DUAL CAVITY DROP GENERATOR

[75] Inventor: David C. VanLokeren, Boulder, Colo.

[73] Assignee: International Business Machines Corp., Armonk, N.Y.

[21] Appl. No.: 215,468

[22] Filed: Dec. 11, 1980

[51] Int. Cl.³ .............................................. G01D 15/18

[52] U.S. Cl. .................................. 346/75; 346/140 R

[58] Field of Search ............... 346/75, 140 PD, 140 IJ

[56] References Cited

U.S. PATENT DOCUMENTS

| | | | |
|---|---|---|---|
| 3,150,592 | 9/1964 | Stec . | |
| 3,848,118 | 11/1974 | Rittberg . | |
| 3,924,974 | 12/1975 | Fischbeck et al. | 346/75 X |
| 4,024,544 | 5/1977 | Vernon | 346/140 PD X |
| 4,245,225 | 1/1981 | Fillmore et al. | 346/75 |
| 4,245,227 | 1/1981 | Krause | 346/75 |
| 4,297,712 | 10/1981 | Lammers et al. | 346/75 |
| 4,303,927 | 12/1981 | Tsao | 346/75 |

OTHER PUBLICATIONS

Lee, H. C. et al., High-Speed Droplet Generator, IBM Tech. Disc. Bulletin, vol. 15, No. 3, Aug. 1972, p. 909.

*Primary Examiner*—George H. Miller, Jr.

*Attorney, Agent, or Firm*—Joscelyn G. Cockburn

[57] ABSTRACT

Described is a dual cavity multinozzle drop generator adaptable for use in an ink jet printer. The drop generator includes a first housing member with an inner cavity. The cavity converges to one side of the housing member. A cylindrical vibrating assembly is positioned within the cavity. The configuration is such that an inner cavity is formed between the outer surface of the vibrating assembly and the inner surface of the housing member. A second housing member having a converging ink cavity therein is coupled to the first housing member. The arrangement is such that the ink cavity is in linear alignment with the inner cavity. A relatively stiff membrane is disposed between the inner cavity and the ink cavity. The inner cavity is filled with an acoustical rubber material. A nozzle plate, having a plurality of spaced linear apertures, is mounted onto the second housing member so that the apertures are in liquid communication with the ink cavity.

14 Claims, 2 Drawing Figures

DUAL CAVITY DROP GENERATOR

CROSS-REFERENCE TO RELATED PATENT APPLICATIONS

Cross reference is made to the copending Patent Application of Konrad A. Krause entitled "Ink Jet Head Having Inner Member Surface Circuitously Parallel to Outer Member Surface," Ser. No. 093,490, filed Nov. 13, 1979, now U.S. Pat. No. 4,245,227 which is a continuation of Application Ser. No. 958,855 filed Nov. 8, 1978, now abandoned and assigned to the same assignee as this application. The Krause application describes a drop generator having an ink cavity formed between the outer surface and the inner surface of an inner cylindrical tube and an outer cylindrical tube, respectively. Either the inner tube or the outer tube is formed from piezoelectrical material. A nozzle plate having one or more apertures is fixedly mounted to the outer cylindrical tube. Pressurized ink is supplied to the ink cavity. An excitation signal is also applied to the piezoelectric crystal. The signal forces the crystal to vibrate in a radial mode and, as a result, capillary streams of ink which are emitted from the apertures in the nozzle plate are broken up into droplet streams.

Cross reference is also made to the copending Patent Application of Gary L. Fillmore et al. entitled "Ink Jet Head," Ser. No. 958,916 filed Nov. 8, 1978 now U.S. Pat. No. 4,245,225 and assigned to the assignee of the present application. In the Fillmore et al. application, a concentric cylindrical drop generator includes a fluid ink cavity disposed between an inner vibrating cylindrical tube and an outer cylindrical tube. A second fluid cavity is disposed outside of the first fluid cavity. The second cavity is filled with ink, while the first cavity is filled with ink or other fluids. A membrane is disposed between the first and second fluid cavity to inhibit the flow of fluids between the two cavities.

The above applications are incorporated in the present application by reference. The present invention describes a dual cavity drop generator with a fluid cavity and a nonfluid cavity. The nonfluid cavity is disposed relative to the excitation crystal. A stiff membrane (preferably alumina) separates the nonfluid cavity from the fluid cavity.

BACKGROUND OF THE INVENTION

1. Field of the Invention

The present invention generally relates to a print head or drop generator for use with ink jet printers and in particular, to the type of ink jet printers where minute streams of ink are continuously extruded from minute openings in the drop generator.

2. Prior Art

The use of nonimpact printers using multinozzle or single nozzle drop generators for printing readable data on a recording surface is well known in the prior art. Such printers may be divided into the drop-on-demand type printers and the continuous type printers. In the drop-on-demand type printers, a drop of print fluid is generated from the drop generator when needed. In the continuous type printers, continuous streams of ink are extruded from the drop generators. A vibrating crystal vibrates the ink so that the continuous streams are broken up into regularly spaced constant size droplets. The droplets are used for printing on the recording surface.

The prior art abounds with continuous type ink jet printers. Generally, these printers consist of a fluid chamber in which ink (which may be magnetic or conductive) is forced in under pressure. One or more discharging nozzles are disposed to be in fluidic communication with the pressurized ink. A vibrating member is associated with the fluid chamber and excites the chamber so that fluid emanating from the nozzles are broken up into droplets. The droplets are subsequently influenced by electrical or mechanical means to print data onto a recording surface. U.S. Pat. Nos. 3,848,118 and 3,924,974 are examples of this prior art.

Other types of prior art ink jet printers such as those referenced in the above-referenced application, use a dual cavity drop generator. One cavity called the vibrating cavity, houses the vibrating crystal and the other cavity houses the print fluid and the discharging nozzles. The vibrating cavity is filled with a fluid. The fluid conveys pressure waves from the vibrating crystal into the print fluid.

One of the problems which plagues the prior art is the inability to maintain a bubble-free vibrating cavity about the vibrating crystal. Air is introduced during the initial filling of the cavity or may appear with time as fluid is leaked from said cavity. Even if a hermetically sealed cavity is obtained initially, it is extremely difficult to maintain such a sealed cavity over an extended period of time, since the seals about the cavity tend to deteriorate with time.

The introduction of air or vacuum bubbles into the fluid disturbs the uniformity of pressure perturbation along the longitudinal axis of the piezoelectric crystal driver. This results in nonuniform droplet break-off between the streams in a multinozzle ink jet array head. With nonuniform breakoff, the placement of droplets on the recording medium cannot be controlled. The net result is that the quality of the print is rather poor or nonacceptable.

The break-off uniformity of the drop generator is also affected by thermal cycling. Thermal cycling occurs when the temperature of the drop generator changes, usually in response to a change in ambient temperature. Usually there is a difference in the coefficient of expansion between the fluid in the resonance cavity and the material which forms said cavity. As the temperature changes, a mismatch in volume is created between the volume of liquid and the volume of the cavity. The mismatch enhances the probability of air entering the cavity and affects the break-off uniformity of the streams. To correct for thermal cycling, the drop generator has to be operated in an environmentally controlled surrounding or a volume compensator must be attached to the resonance cavity to ensure satisfactory operation. Needless to say, neither of the solutions are acceptable due to cost and undue restriction on the use of the drop generator.

Another problem associated with the prior art drop generator is that the response time is relatively slow. The response time is the time it takes the drop generator to go from a start-up state at zero pressure to an operational state at a predetermined pressure. Stated another way, the response time is the time it takes the drop generator to go from an off condition until the streams are fully established (that is, ready for printing).

SUMMARY OF THE INVENTION

It is therefore the object of the present invention to provide a more efficient drop generator than has heretofore been possible.

It is yet another object of the present invention to provide a drop generator suitable to withstand a wide range of thermal cycling without any degradation in performance.

It is still another object of the present invention to provide a drop generator having a response time substantially less than has heretofore been possible.

These and other objectives are achieved by a drop generator having a resonance cavity with a radially vibrating crystal(s) disposed therein. The resonance cavity is filled with a nonliquid compound, such as an acoustical rubber. An ink cavity is disposed exterior to the resonance cavity. A relatively stiff membrane is interposed between the cavities. The thickness of the membrane is such that it acoustically couples the resonance cavity with the ink cavity so that transmission loss through the membrane is at a minimum and the membrane stiffness is at a maximum. A plurality of discharging orifices are coupled to the ink cavity and operate to discharge ink therefrom.

The foregoing and other objects, features and advantages of the invention will be apparent from the following more particular description of a preferred embodiment of the invention, as illustrated in the accompanying drawings.

DETAILED DESCRIPTION OF THE INVENTION

Figure 1:
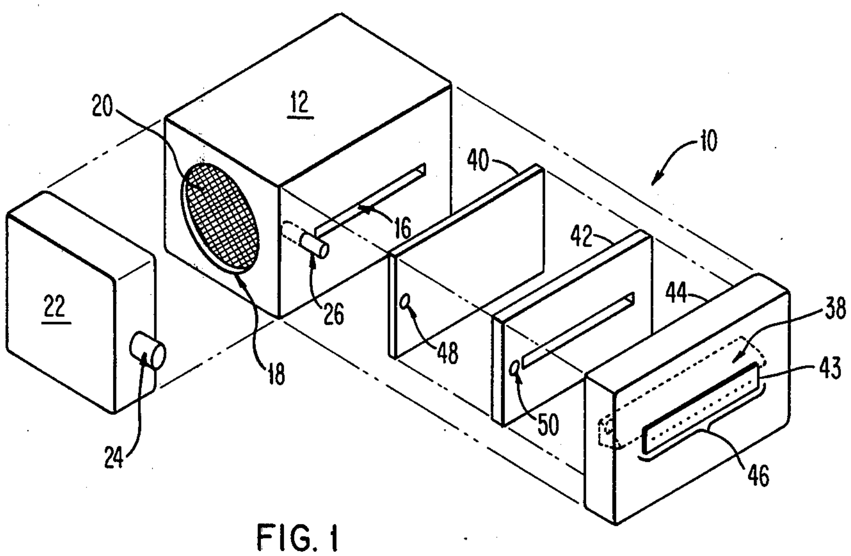
FIG. 1 is a nonassembled perspective view of a drop generator according to the teaching of the present invention.
Figure 2:
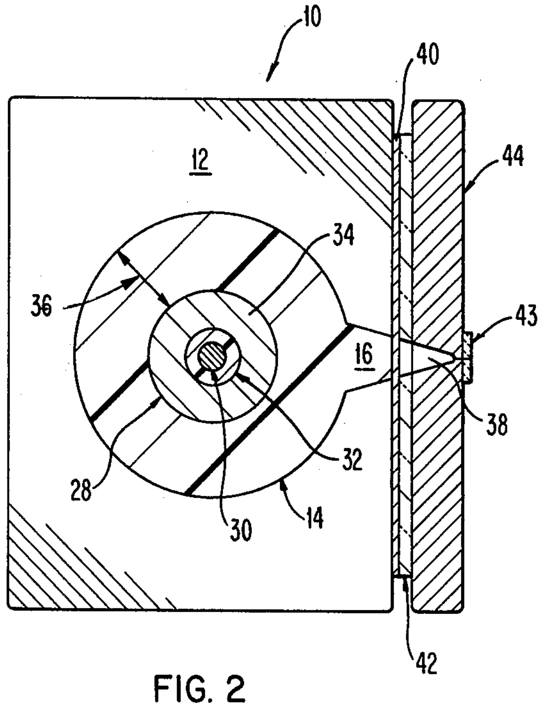
FIG. 2 shows a cross-sectional view of the drop generator of FIG. 1.

FIGS. 1 and 2 show a dual cavity resonance drop generator according to the teaching of the present invention. In the drawings, common elements will be identified by the same numerals. The drop generator 10 includes a back support member 12. The back support member has a rectangular shape and is fabricated from stainless steel or some other type of material with high acoustic impedance. A cylindrical resonance cavity 14 is bored in the central section of the back support member. A focusing cavity 16 converges from the cylindrical bore to one side of the back support member. An ink receiving cavity 18 is fabricated in one surface of the drop generator. An ink filtering screen 20 is disposed within the ink receiving cavity. A cavity cap 22 is disposed over the ink receiving cavity. An ink inlet port 24 is fabricated within the cavity cap 22. Similarly, an ink outlet port 26 is fabricated in another surface of the back support member 12. It should be noted that the resonance cavity 14 is not in fluidic communication with the ink receiving cavity 18. Stated another way, the ink receiving cavity 18 and the resonance cavity 14 are separated by an impervious wall. As such, ink under pressure is supplied from a pressurized source (not shown) through ink inlet port 24. The ink is forced through the filter 20 and exits from the ink receiving cavity through ink outlet port 26. Any foreign bodies such as dirt, etc. which are in the ink are filtered out by the filter.

The resonance cavity 14 is preferably cylindrical in shape and is positioned to run parallel to the longitudinal axis of the back support member 12. The converging focusing cavity 16 also runs parallel to the longitudinal axis of the back support member. A disturbance means 28 is mounted within the resonance cavity 14. The disturbance means is preferably cylindrical in shape and runs along the longitudinal axis of the resonance cavity. The disturbance means includes a steel mounting rod 30. A rubber-like material 32 is mounted or molded onto the steel mounting rod. One or more cylindrically shaped piezoelectric crystals 34 are mounted onto the rubber-like material 32. The steel rod 30 is mounted at opposite ends to opposite walls of the back support member 12. The space 36 which is disposed between the outer surface of the disturbance means 28 and the inner surface of the back support member 12 forms a resonance cavity.

The resonance cavity is filled with an acoustical type rubber material. In the preferred embodiment of the present invention, the acoustical rubber is molded directly into the cavity. Stated another way, the acoustical rubber is forced under pressure into the resonance cavity. As such, air is evacuated from the space following the forcing of the rubber. The rubber is then cured and attaches securely to the walls of the back support member and the outer surface of the crystal. Because the bond between the rubber, the crystal and the steel housing is firmed, coupled with the fact that the thermal coefficient of expansion of the acoustical rubber more closely matches that of the steel back support member, changes in temperature do not significantly alter the volume of the resonance cavity. As such, air bubbles do not enter the cavity over long periods or short periods of use.

Although a plurality of acoustical rubber formulations may be used to fill the resonance cavity, a particular rubber formulation manufactured, by B. F. Goodrich and identified as "Rho-C Compound 35075" gives excellent results. The use of Rho-C Compound 35075 offers the additional advantages of low curing temperature, low shrinkage, and ability to bond well to primed metallic surfaces. When an electrical excitation means (not shown) is coupled to the cylindrical crystal, and a signal is outputted into the crystals, the crystals vibrate in a radial mode and pressure waves are created in the resonance cavity. The pressure waves are transmitted by the Rho-C compound through the focusing cavity 16 and into the ink cavity 38. As is explained in the above-referenced applications, the pressure waves force capillary streams emanating from the nozzle wafer 43 to break up into regularly spaced constant size droplets.

Still referring to FIGS. 1 and 2, the ink cavity 38 is separated from the resonance cavity 36 by an acoustical coupling means 40. In the preferred embodiment of the present invention, the acoustical coupling means 40 is fabricated from a relatively stiff material. As is used in this application, the word stiff means a material having a Young's modulus of approximately $45\times10^6$ psi. For optimum operation, it is also necessary that the density of the material be relatively low. It is also necessary that the acoustical characteristic of the coupling means substantially matches the acoustical characteristic of the Rho-C compound and the writing fluid which is introduced in cavity 38. With matching characteristics, the transmission loss of pressure waves at the interface between the Rho-C compound and the print fluid is substantially reduced and the performance of the drop generator is enhanced. It has been observed that an alumina membrane forms an excellent acoustical coupling means in the present invention. Excellent operation has been achieved when the thickness of the alumina membrane is approximately 10 mils. By using a relatively stiff membrane, and in particularly an alumina membrane having a thickness of approximately 10 mils, the response time of the drop generator is approximately ½ of a millisecond. It is believed that the relatively fast response from the head stems from the fact that as pressurized ink is introduced into the ink cavity 38, the membrane 40 is stiff enough to withstand the ink pressure and does not bow, (that is move or bend) into the resonance cavity. The movement is often referred to as the compliance in the membrane. By lowering the compliance of the system with a stiff membrane, the response time of the head significantly improves.

A gasket 42 is disposed next to the membrane 40. The gasket is fabricated with a central opening which surrounds the periphery of ink cavity 38. The gasket functions to prevent ink from leaking out of the ink cavity. A face plate 44 is disposed next to the gasket. Ink cavity 38 has a converging or V-shaped geometry and is fabricated in the face plate 44. The shape of the face plate is substantially equivalent to that of back support member 12 with the ink cavity running parallel to the cylindrical cavity in the back support member. A nozzle wafer 43 having a plurality of orifices 46 is mounted onto the face plate 44. The arrangement is such that the orifices are in fluidic communication with the ink cavity 38. As is evident from FIG. 2, the various enumerated components of the drop generator are fastened together by suitable fastening means (not shown) so that the liquid cavity 38 is in linear alignment with the focusing cavity 16 of the resonance cavity 36. The alumina membrane 40 separates the ink cavity 38 from the resonance cavity 36. As a result of the membrane, ink in the cavity does not flow into the resonance cavity. As is shown more clearly in FIG. 1, ink is supplied through ink outlet port 26 into the ink cavity 38. The outlet port is fitted through holes 48 and 50 respectively to supply ink into the ink cavity.

In an alternate embodiment of the present invention, the pressurized ink is introduced directly into the ink cavity from the pressurized source. In the embodiment there is no cavity cap or ink receiving cavity on the back support member 12. In operation, pressurized ink is supplied into the ink cavity. A plurality of capillary streams of ink are emitted from orifices 46. As an electrical signal is supplied to the crystal(s) (34), the crystal vibrates, that is expand and contract in a radial mode, and standing waves are generated in the resonance cavity. The waves are coupled by the acoustical rubber through focusing cavity 16 and the alumina membrane into the ink cavity 38. As a result of the waves, a plurality of constant size equally spaced ink droplets are generated from each of the minute streams emanating from the orifices.

One advantage resulting from the above-described drop generator is that the generator can be used in an environment with a wide range of temperature changes without adverse effects in the performance of the head.

Another advantage is that the response time of the head is within the range of ½ of a millisecond.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A drop generator for generating one or more droplet streams for printing on a recording media comprising:
- a first support means having a cavity therein;
- a means for generating a disturbance disposed within said cavity;
- a resonance cavity disposed between the outer surface of the means for generating the disturbance and the inner surface of the cavity;
- an acoustical rubber disposed within the resonance cavity and operable to transmit pressure waves outputted by the disturbance means;
- an ink cavity disposed external to the resonance cavity, said ink cavity being in acoustical communication with the resonance cavity;
- means to acoustically couple the resonance cavity with the ink cavity;
- means for supplying pressurized ink into said ink cavity; and
- a nozzle support plate having one or more apertures therein disposed so that the apertures are in fluidic communication with the ink cavity.

2. The drop generator of claim 1 wherein the first support means is being fabricated from steel.

3. The drop generator of claim 1 wherein the resonance cavity is cylindrical.

4. The drop generator of claim 1 wherein the acoustical rubber is being formulated from Rho-C compound.

5. The drop generator of claim 1 further including a gasket disposed about the ink cavity and operable to prevent ink leakage from said cavity.

6. The drop generator of claim 5 wherein the gasket is being fabricated from polyethylene material.

7. The drop generator of claim 1 wherein the means for generating the disturbance includes:
- a steel mounting rod;
- a rubber material mounted on said rod; and
- at least one piezoelectric crystal mounted on the rubber material.

8. The drop generator of claim 7 wherein the piezoelectric crystal is cylindrical.

9. The drop generator of claim 1 wherein the means for acoustically coupling the resonance cavity to the ink cavity is being fabricated from a material having wave transmission characteristics and acoustical characteristics substantially equivalent to that of the ink and the acoustical rubber.

10. The drop generator of claim 9 wherein the means for acoustically coupling the resonance cavity is fabricated from alumina.

11. The drop generator of claim 10 wherein the alumina is approximately 10 mils thick.

12. In a dual cavity resonance drop generator wherein a disturbance means is being positioned within a resonance cavity and an ink cavity is being disposed exterior to the resonance cavity, the improvement comprising:
- an acoustical rubber being disposed within the resonance cavity and operable to transmit disturbances generated from the disturbance means; and
- a membrane means disposed between the resonance cavity and the ink cavity, said membrane means being operable to couple the disturbance from the resonance cavity into the ink cavity.

13. The dual cavity resonance drop generator of claim 12 wherein the acoustical rubber substance is being molded into the resonance cavity.

14. The dual cavity resonance drop generator of claim 12 wherein the membrane means has a relatively high stiffness and relatively low density.

* * * * *